United States Patent
Shyshkin et al.

(10) Patent No.: US 11,457,206 B2
(45) Date of Patent: *Sep. 27, 2022

(54) OPTICAL CORRECTION SYSTEMS AND METHODS FOR CORRECTING NON-UNIFORMITY OF EMISSIVE DISPLAY DEVICES

(71) Applicant: Ignis Innovation Inc., Waterloo (CA)

(72) Inventors: Vyacheslav Shyshkin, Mississauga (CA); Adam Saechao, Kitchener (CA)

(73) Assignee: IGNIS INNOVATION INC., Waterloo (CA)

( * ) Notice: Subject to any disclaimer, the term of this patent is extended or adjusted under 35 U.S.C. 154(b) by 0 days.

This patent is subject to a terminal disclaimer.

(21) Appl. No.: 17/245,090

(22) Filed: Apr. 30, 2021

(65) Prior Publication Data

US 2021/0250574 A1 Aug. 12, 2021

Related U.S. Application Data

(63) Continuation of application No. 15/675,095, filed on Aug. 11, 2017, now Pat. No. 11,025,899.

(51) Int. Cl.
| | |
|---|---|
| *G09G 3/00* | (2006.01) |
| *G09G 3/3225* | (2016.01) |
| *H04N 17/04* | (2006.01) |
| *G01J 1/02* | (2006.01) |
| *G01J 1/32* | (2006.01) |

(52) U.S. Cl.
CPC ............ *H04N 17/04* (2013.01); *G01J 1/0228* (2013.01); *G01J 1/32* (2013.01); *G09G 3/006* (2013.01); *G09G 3/3225* (2013.01); *G09G 2320/0233* (2013.01); *G09G 2320/0693* (2013.01)

(58) Field of Classification Search
None
See application file for complete search history.

(56) References Cited

U.S. PATENT DOCUMENTS

| | | |
|---|---|---|
| 6,181,376 B1 | 1/2001 | Rashkovskiy et al. |
| 2014/0300756 A1 | 10/2014 | Murase |
| 2016/0267838 A1* | 9/2016 | Zhang .................. G09G 3/2003 |
| 2016/0284258 A1 | 9/2016 | Brunner et al. |

OTHER PUBLICATIONS

First Page of Office Action issued on corresponding Chinese Patent Application No. 201810910187.7, dated Feb. 14, 2022.

* cited by examiner

*Primary Examiner* — Chad M Dicke
(74) *Attorney, Agent, or Firm* — Stratford Group Ltd.

(57) ABSTRACT

What is disclosed are systems and methods of optical correction for pixel evaluation and correction for active matrix light emitting diode device (AMOLED) and other emissive displays. Optical correction for correcting for non-homogeneity of a display panel uses sparse display test patterns in conjunction with a defocused camera as the measurement device to avoid aliasing (moiré) of the pixels of the display in the captured images.

22 Claims, 4 Drawing Sheets

OPTICAL CORRECTION SYSTEMS AND METHODS FOR CORRECTING NON-UNIFORMITY OF EMISSIVE DISPLAY DEVICES

CROSS REFERENCE TO RELATED APPLICATION

This application is a continuation of U.S. patent application Ser. No. 15/675,095, filed Aug. 11, 2017, now allowed, which is hereby incorporated by reference in its entirety.

FIELD OF THE INVENTION

The present disclosure relates to optically measuring and calibrating light emissive visual display technology, and particularly to optical correction systems and methods for individual pixel luminance evaluation and correction for active matrix organic light emitting diode device (AMOLED) and other emissive displays.

BRIEF SUMMARY

According to a first aspect there is provided an optical correction method for correcting for non-uniformity of an emissive display panel having pixels, each pixel having a light-emitting device, the method comprising: arranging a camera in front of the display panel; defocusing the camera such that the focal point of the camera lies outside of a plane passing through the light-emitting devices of the display panel, the defocusing such that individual pixels of the display panel are blurred in images of the display panel captured by the camera; displaying a plurality of test patterns while capturing respective images of said test patterns displayed, said captured images for use as luminance measurement data for pixels of the display panel, each of said displayed test patterns comprising a set of activated pixels spaced apart such that in each captured image, at least one portion of each blurred image of each activated pixel does not overlap with a blurred image of another activated pixel; and determining from said luminance measurement data, correction data for correcting non-uniformity of images displayed in the display panel.

In some embodiments, the amount of blurring in images of the display panel captured by the camera is sufficient to avoid aliasing in the captured images of the display panel.

In some embodiments, a resolution of the camera is less than twice a resolution of the display panel. In some embodiments, said activated pixels of each displayed test pattern are arranged in a diamond or rectangular lattice.

In some embodiments, said activated pixels of the plurality of displayed test patterns comprise regular test pixels, each of said regular test pixels of said plurality of displayed test patterns having a greyscale luminance value selected from a set of at least two predetermined greyscale luminance values. In some embodiments, the set of at least two predetermined greyscale luminance values includes a relatively low greyscale luminance value and a relatively high greyscale luminance value.

In some embodiments, said activated pixels of the plurality of the displayed test patterns comprise multilevel pixels, each of said multilevel pixels of said plurality of displayed test patterns having a greyscale luminance value greater or less than one of the greyscale luminance values of the set of at least two predetermined greyscale luminance values by a relatively small greyscale luminance value.

Some embodiments further provide for determining correction data for each pixel of the display panel with use of a first luminance measurement of that pixel when displaying a first greyscale luminance value of the set of at least two predetermined greyscale luminance values and a second luminance measurement of that pixel when displaying a second greyscale luminance value of the set of at least two predetermined greyscale luminance values, and with use of a scale factor for that pixel determined with use of luminance measurements of pixels throughout the display panel when displaying the multilevel pixels of the displayed test patterns.

In some embodiments, said activated pixels of the plurality of the displayed test patterns comprise calibration pixels, the embodiment further providing for determining locations of the activated pixels of the displayed test patterns as they appear in the captured images of the displayed test patterns; and determining at least one point spread function exhibited by blurred images of activated pixels of the displayed test pattern in the captured images, in which the activated pixels of the plurality of displayed test patterns are spaced apart such that in the captured images, blurred images of each calibration pixel does not overlap with blurred images of any other activated pixel.

In some embodiments, each of the luminance measurements of each of the regular test pixels and each of the multilevel pixels is performed with use of an acquisition kernel determined from at least one of a spacing of the activated pixels of the displayed test patterns and the at least one point spread function.

In some embodiments, the relatively low greyscale luminance value is substantially 10 percent of the maximum possible greyscale luminance value, and the relatively high greyscale luminance value is substantially 80 percent of the maximum greyscale luminance value. In some embodiments, the relatively small greyscale luminance value is one of substantially 1 percent of the maximum possible greyscale luminance value and the smallest incremental digital value of possible greyscale luminance values.

In some embodiments, all of said regular test pixels of the relatively low greyscale luminance value are displayed in a first set of sparse flat test patterns, wherein all of said regular test pixels of the relatively high greyscale luminance value are displayed in a second set of sparse flat test patterns, wherein all of said multilevel pixels having a greyscale luminance value greater or less than the relatively low greyscale luminance value are displayed in a first set of multilevel patterns, and wherein all of said multilevel pixels having a greyscale luminance value greater or less than the relatively high greyscale luminance value are displayed in a second set of multilevel patterns.

Some embodiments further provide for correcting image data with use of the correction data prior to driving the pixels to display an image corresponding to the image data.

According to a second aspect there is provided an optical correction system for correcting non-uniformity of an emissive display having pixels, each pixel having a light-emitting device, the system comprising: a camera arranged in front of the display for capturing images of a plurality of test patterns displayed on the display, the camera defocused such that the focal point of the camera lies outside of a plane passing through the light-emitting devices of the display and such that individual pixels of the display are blurred in images of the display captured by the camera, each of said displayed test patterns comprising a set of activated pixels spaced apart such that in each captured image, at least one portion of each blurred image of each activated pixel does not overlap with a blurred image of another activated pixel; optical correction processing coupled to the camera and for receiving from the camera captured images of said test patterns displayed on the display, said captured images for use as luminance measurement data for pixels of the display; determining from said luminance measurement data, correction data for correcting non-uniformity of images displayed in the display; and transmitting the correction data to the display for storage in a memory of the display.

In some embodiments, the optical correction processing is further for determining correction data for each pixel of the display with use of a first luminance measurement of that pixel when displaying a first greyscale luminance value of the set of at least two predetermined greyscale luminance values and a second luminance measurement of that pixel when displaying a second greyscale luminance value of the set of at least two predetermined greyscale luminance values, and with use of a scale factor for that pixel determined with use of luminance measurements of pixels throughout the display when displaying the multilevel pixels of the displayed test patterns.

In some embodiments, said activated pixels of the plurality of the displayed test patterns comprise calibration pixels, and wherein the optical correction processing is further for determining locations of the activated pixels of the displayed test patterns as they appear in the captured images of the displayed test patterns; and determining at least one point spread function exhibited by blurred images of activated pixels of the displayed test pattern in the captured images, wherein the activated pixels of the plurality of displayed test patterns are spaced apart such that in the captured images, blurred images of each calibration pixel does not overlap with blurred images of any other activated pixel.

In some embodiments, each of the luminance measurements of each of the regular test pixels and each of the multilevel pixels is performed by the optical correction processing with use of an acquisition kernel determined from at least one of a spacing of the activated pixels of the displayed test patterns and the at least one point spread function.

Some embodiments, further provide for a controller of the emissive display system coupled to said optical correction processing, said controller for receiving image data for display by the display; receiving from the optical correction processing the correction data; and correcting the image data with use of the correction data prior to driving the pixels to display an image corresponding to the image data.

The foregoing and additional aspects and embodiments of the present disclosure will be apparent to those of ordinary skill in the art in view of the detailed description of various embodiments and/or aspects, which is made with reference to the drawings, a brief description of which is provided next.

BRIEF DESCRIPTION OF THE DRAWINGS

The foregoing and other advantages of the disclosure will become apparent upon reading the following detailed description and upon reference to the drawings.

Figure 1:
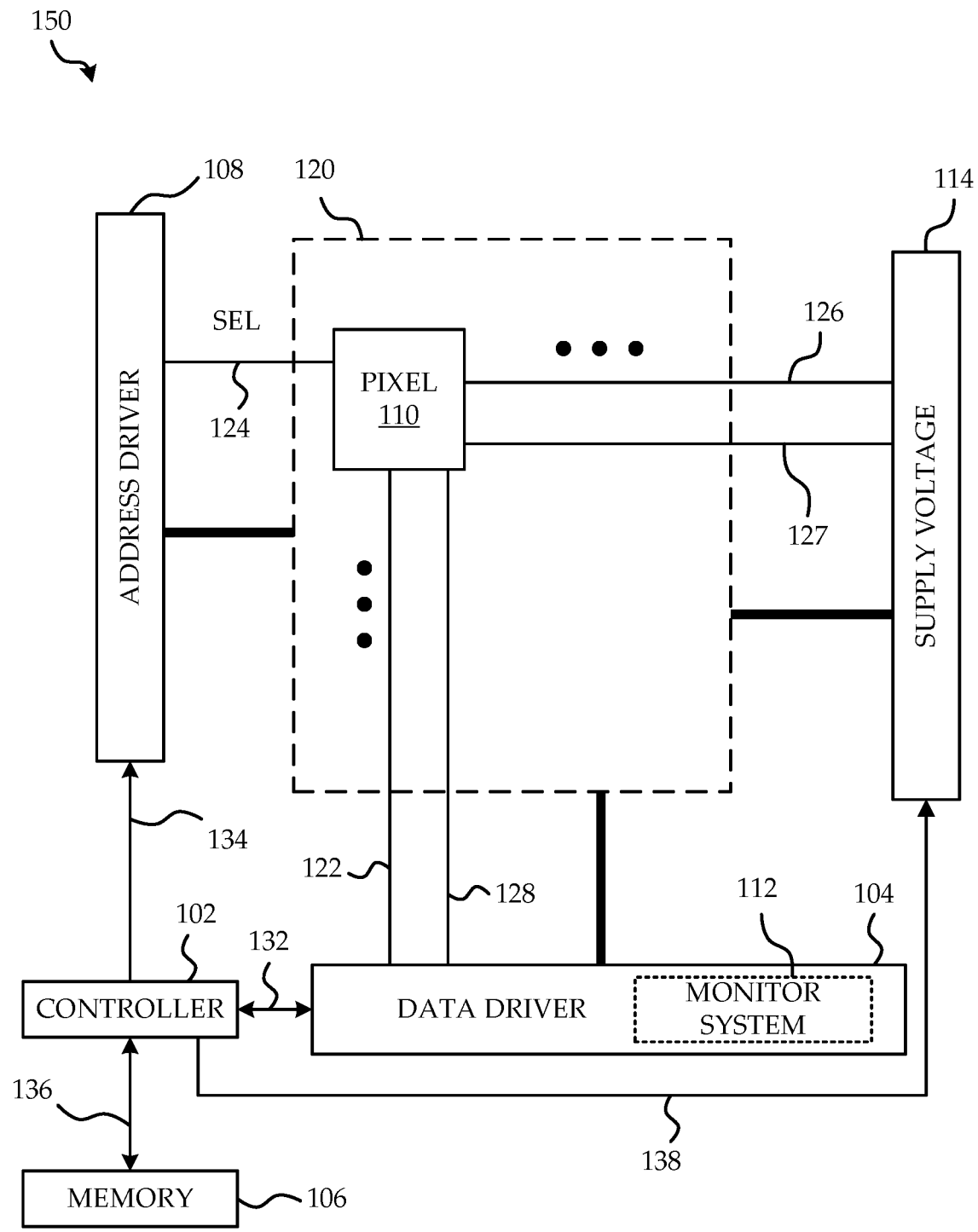
FIG. 1 illustrates an example display system which participates in and whose pixels are to be measured and corrected by the optical correction systems and methods disclosed.

While the present disclosure is susceptible to various modifications and alternative forms, specific embodiments or implementations have been shown by way of example in the drawings and will be described in detail herein. It should be understood, however, that the disclosure is not intended to be limited to the particular forms disclosed. Rather, the disclosure is to cover all modifications, equivalents, and alternatives falling within the spirit and scope of an invention as defined by the appended claims.

DETAILED DESCRIPTION

Many modern display technologies suffer from defects, variations, and non-uniformities, from the moment of fabrication, and can suffer further from aging and deterioration over the operational lifetime of the display, which result in the production of images which deviate from those which are intended. Optical correction systems and methods can be used, either during fabrication or after a display has been put into use, to measure and correct pixels (and sub-pixels) whose output luminance varies from the expected luminance. AMOLED panels in particular are characterized by luminance non-uniformity.

To correct for this intrinsic non-uniformity of the display, the incoming video signal is deliberately modified with compensation data or correction data such that it compensates for the non-uniformity. In some approaches, to obtain the correction data the luminance of each individual panel pixel is measured for a range of greyscale luminance values, and correction values for each pixel are determined. A typical setup utilizes a monochrome or conventional RGB still picture camera as the measurement device. At least one calibration pattern is displayed on the display and captured with the camera. Measurements in the form of captured images are then processed to extract the actual luminance of each individual pixel of the display. Taking into account the greyscale luminance value of the pixel of the calibration pattern which was used to drive the pixel of the display, a correction signal for that pixel of the display driven at that greyscale luminance value is generated. Limitations with this technique arise when the spatial sampling rate of the camera falls below two times the spatial frequency of the pixel image of the display. According to well-known sampling principles, the camera should operate at or above the Nyquist rate, i.e. at or above twice the frequency of the pixel image of the display, in order to reconstruct the displayed image accurately from a single captured image taken by the camera. When the sampling rate of the camera falls below twice the image pixel rate of the display, the reconstructed image will suffer from aliasing (moiré) and pixel overlap, i.e. images of different pixels of the display will overlap in images taken by the camera. As displays are produced with increasingly higher and higher resolutions this poses a problem for obtaining correction data with existing standard resolution cameras which do not have resolutions as high as twice as that of the display, and alternatively increases costs by necessitating deployment of optical correction systems which include much higher resolution cameras.

While the embodiments described herein will be in the context of AMOLED displays it should be understood that the optical correction systems and methods described herein are applicable to any other display comprising pixels, including but not limited to light emitting diode displays (LED), electroluminescent displays (ELD), organic light emitting diode displays (OLED), plasma display panels (PSP), microLED or quantum dot displays, among other displays.

It should be understood that the embodiments described herein pertain to systems and methods of optical correction and compensation and do not limit the display technology underlying their operation and the operation of the displays in which they are implemented. The systems and methods described herein are applicable to any number of various types and implementations of various visual display technologies.

FIG. 1 is a diagram of an example display system 150 implementing the methods described further below in conjunction with an arrangement with a camera and optical correction processing. The display system 150 includes a display panel 120, an address driver 108, a data driver 104, a controller 102, and a memory storage 106.

The display panel 120 includes an array of pixels 110 (only one explicitly shown) arranged in rows and columns. Each of the pixels 110 is individually programmable to emit light with individually programmable luminance values. The controller 102 receives digital data indicative of information to be displayed on the display panel 120. The controller 102 sends signals 132 to the data driver 104 and scheduling signals 134 to the address driver 108 to drive the pixels 110 in the display panel 120 to display the information indicated. The plurality of pixels 110 of the display panel 120 thus comprise a display array or display screen adapted to dynamically display information according to the input digital data received by the controller 102. The display screen and various subsets of its pixels define "display areas" which may be used for monitoring and managing display brightness. The display screen can display images and streams of video information from data received by the controller 102. The supply voltage 114 provides a constant power voltage or can serve as an adjustable voltage supply that is controlled by signals from the controller 102. The display system 150 can also incorporate features from a current source or sink (not shown) to provide biasing currents to the pixels 110 in the display panel 120 to thereby decrease programming time for the pixels 110.

For illustrative purposes, only one pixel 110 is explicitly shown in the display system 150 in FIG. 1. It is understood that the display system 150 is implemented with a display screen that includes an array of a plurality of pixels, such as the pixel 110, and that the display screen is not limited to a particular number of rows and columns of pixels. For example, the display system 150 can be implemented with a display screen with a number of rows and columns of pixels commonly available in displays for mobile devices, monitor-based devices, and/or projection-devices. In a multichannel or color display, a number of different types of pixels, each responsible for reproducing color of a particular channel or color such as red, green, or blue, will be present in the display. Pixels of this kind may also be referred to as "subpixels" as a group of them collectively provide a desired color at a particular row and column of the display, which group of subpixels may collectively also be referred to as a "pixel".

The pixel 110 is operated by a driving circuit or pixel circuit that generally includes a driving transistor and a light emitting device. Hereinafter the pixel 110 may refer to the pixel circuit. The light emitting device can optionally be an organic light emitting diode, but implementations of the present disclosure apply to pixel circuits having other electroluminescence devices, including current-driven light emitting devices and those listed above. The driving transistor in the pixel 110 can optionally be an n-type or p-type amorphous silicon thin-film transistor, but implementations of the present disclosure are not limited to pixel circuits having a particular polarity of transistor or only to pixel circuits having thin-film transistors. The pixel circuit 110 can also include a storage capacitor for storing programming information and allowing the pixel circuit 110 to drive the light emitting device after being addressed. Thus, the display panel 120 can be an active matrix display array.

As illustrated in FIG. 1, the pixel 110 illustrated as the top-left pixel in the display panel 120 is coupled to a select line 124, a supply line 126, a data line 122, and a monitor line 128. A read line may also be included for controlling connections to the monitor line. In one implementation, the supply voltage 114 can also provide a second supply line to the pixel 110. For example, each pixel can be coupled to a first supply line 126 charged with Vdd and a second supply line 127 coupled with Vss, and the pixel circuits 110 can be situated between the first and second supply lines to facilitate driving current between the two supply lines during an emission phase of the pixel circuit. It is to be understood that each of the pixels 110 in the pixel array of the display 120 is coupled to appropriate select lines, supply lines, data lines, and monitor lines. It is noted that aspects of the present disclosure apply to pixels having additional connections, such as connections to additional select lines, and to pixels having fewer connections.

With reference to the pixel 110 of the display panel 120, the select line 124 is provided by the address driver 108, and can be utilized to enable, for example, a programming operation of the pixel 110 by activating a switch or transistor to allow the data line 122 to program the pixel 110. The data line 122 conveys programming information from the data driver 104 to the pixel 110. For example, the data line 122 can be utilized to apply a programming voltage or a programming current to the pixel 110 in order to program the pixel 110 to emit a desired amount of luminance. The programming voltage (or programming current) supplied by the data driver 104 via the data line 122 is a voltage (or current) appropriate to cause the pixel 110 to emit light with a desired amount of luminance according to the digital data received by the controller 102. The programming voltage (or programming current) can be applied to the pixel 110 during a programming operation of the pixel 110 so as to charge a storage device within the pixel 110, such as a storage capacitor, thereby enabling the pixel 110 to emit light with the desired amount of luminance during an emission operation following the programming operation. For example, the storage device in the pixel 110 can be charged during a programming operation to apply a voltage to one or more of a gate or a source terminal of the driving transistor during the emission operation, thereby causing the driving transistor to convey the driving current through the light emitting device according to the voltage stored on the storage device.

Generally, in the pixel 110, the driving current that is conveyed through the light emitting device by the driving transistor during the emission operation of the pixel 110 is a current that is supplied by the first supply line 126 and is drained to a second supply line 127. The first supply line 126 and the second supply line 127 are coupled to the voltage supply 114. The first supply line 126 can provide a positive supply voltage (e.g., the voltage commonly referred to in circuit design as "Vdd") and the second supply line 127 can provide a negative supply voltage (e.g., the voltage commonly referred to in circuit design as "Vss"). Implementations of the present disclosure can be realized where one or the other of the supply lines (e.g., the supply line 127) is fixed at a ground voltage or at another reference voltage.

The display system 150 also includes a monitoring system 112. With reference again to the pixel 110 of the display panel 120, the monitor line 128 connects the pixel 110 to the monitoring system 112. The monitoring system 12 can be integrated with the data driver 104, or can be a separate stand-alone system. In particular, the monitoring system 112 can optionally be implemented by monitoring the current and/or voltage of the data line 122 during a monitoring operation of the pixel 110, and the monitor line 128 can be entirely omitted. The monitor line 128 allows the monitoring system 112 to measure a current or voltage associated with the pixel 110 and thereby extract information indicative of a degradation or aging of the pixel 110 or indicative of a temperature of the pixel 110. In some embodiments, display panel 120 includes temperature sensing circuitry devoted to sensing temperature implemented in the pixels 110, while in other embodiments, the pixels 110 comprise circuitry which participates in both sensing temperature and driving the pixels. For example, the monitoring system 112 can extract, via the monitor line 128, a current flowing through the driving transistor within the pixel 110 and thereby determine, based on the measured current and based on the voltages applied to the driving transistor during the measurement, a threshold voltage of the driving transistor or a shift thereof.

The controller and 102 and memory store 106 together or in combination with a compensation block (not shown) use compensation data or correction data, in order to address and correct for the various defects, variations, and non-uniformities, existing at the time of fabrication, and optionally, defects suffered further from aging and deterioration after usage. In some embodiments, the correction data includes data for correcting the luminance of the pixels obtained through measurement and processing using an external optical feedback system such as that described below. Some embodiments employ the monitoring system 112 to characterize the behavior of the pixels and to continue to monitor aging and deterioration as the display ages and to update the correction data to compensate for said aging and deterioration over time.

For the embodiments disclosed herein, correction data is directly determined during an optical correction operation either during or subsequent to fabrication or after the display has been in operation for some time, from observing the luminance of each pixel and determining the correction data to produce luminance of an acceptable level.

Figure 2:
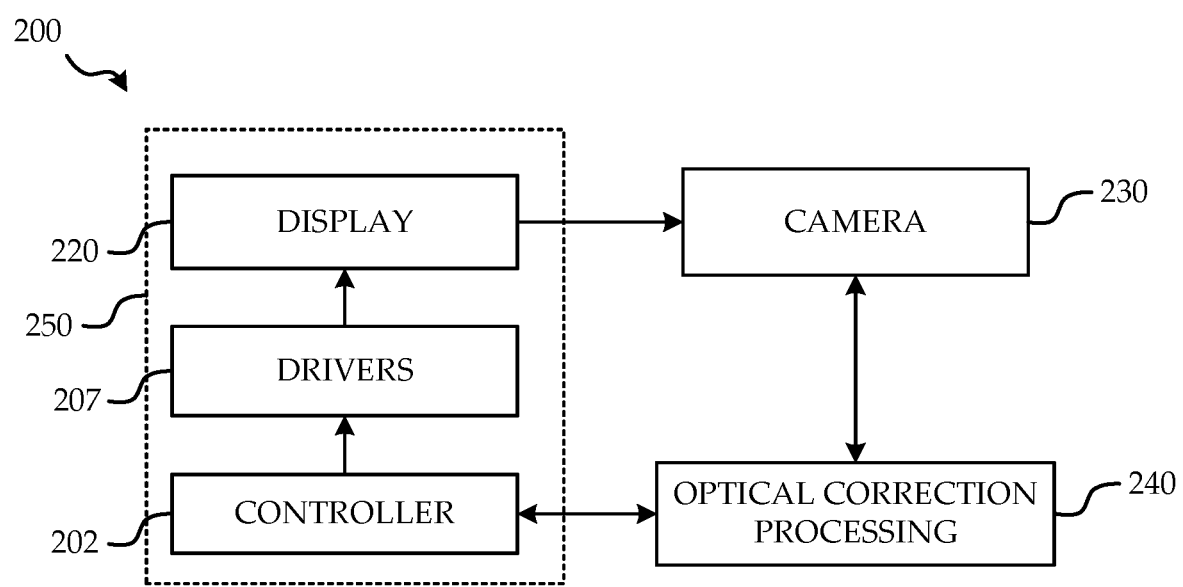
FIG. 2 is a system block diagram of an optical correction system.

Referring to FIG. 2, an optical correction system 200 according to an embodiment will now be described.

The optical correction system 200 includes display system 250 which is to be corrected, a camera 230, a controller 202 for overall control the process, which in the embodiment of FIG. 2 is shown as part of the display system 250, and an optical correction processing module 240 for controlling specific processes of the optical correction methods. The optical correction processing 240 can be part of an external tool that is used for example in a production factory for correction of the displays. In another case, optical correction processing 240 can be part of the display system and/or the controller, for example, integrated in a timing controller TCON. The display system 250 of FIG. 2 may correspond more or less to the display system 150 of FIG. 1 and includes similar components thereof, of which specifically, drivers 207, the display panel 220, and the controller 202 are shown explicitly for convenience. The controller 202 may correspond to controller 102 or controller 102 and memory 106 of FIG. 1.

The camera 230 is arranged to measure the luminance of all of the pixels 110 of the display panel 220. The camera 230 may be based on a digital photography system with lenses, and may be a monochromatic digital camera or a standard digital camera, such as a monochromatic or RGB, CCD CMOS or other sensor array based camera, or any other suitable optical measurement technology capable of taking optical images through a lens and generating a luminance measurement image representative of the optical output of the display panel 220. Optical correction processing 240 receives the luminance measurement image data from the camera 230. Luminance measurement image data refers to any matrix containing optical luminance data corresponding to the output of the display panel 220, and may comprise multiple channels such as red (R), green (G), blue (B) etc. and in some cases may be monochromatic as in the case where the camera 230 is monochromatic. Hereinafter, luminance measurement image data will be referred to simply as a "captured image" and if monochromatic, will be assumed to include one luminance value for every pixel of the captured image. It should be understood that any reference made to "greyscale luminance value" is a reference to the DAC (Digital to Analogue Converter) signal data value used to drive a pixel and which results in a pixel producing an actual luminance. For simplicity, the preset luminance values associated with the various pixel patterns described below are characterized in terms of the corresponding DAC signal i.e. greyscale luminance value which is used to drive the pixels. Advantages of using a monochromatic camera versus an RGB camera include faster exposure times, avoidance of display and sensor R,G,B frequency mismatch and/or crosstalk, avoidance of mismatching numbers or arrangements of the R,G,B sub-pixels of the display and the R,G,B elements of the sensor array, and ease of handing yellow or white subpixels of display panel 220. In some embodiments utilizing either a monochromatic or an RGB camera, measurements of each pixel of the display occurs only for a single channel or subpixel color (R, G, B, Y, or W etc.) at any one time.

For the embodiments herein described, the resolution of the camera 230 and equally a ratio of the resolution of the camera 230 to the resolution of the display panel 220, are not required to exceed the thresholds otherwise required according to the Nyquist rate. This is because the camera is intentionally defocused and test patterns incorporate activated pixels whose blurred images have portions which do not overlap with one another, as described below. In particular, the resolution of the camera 230 need not be greater than twice the resolution of the display panel 220. The camera 230 may be operated manually or automatically controlled by one or both of the controller 202 and optical correction processing 240.

Figure 3:
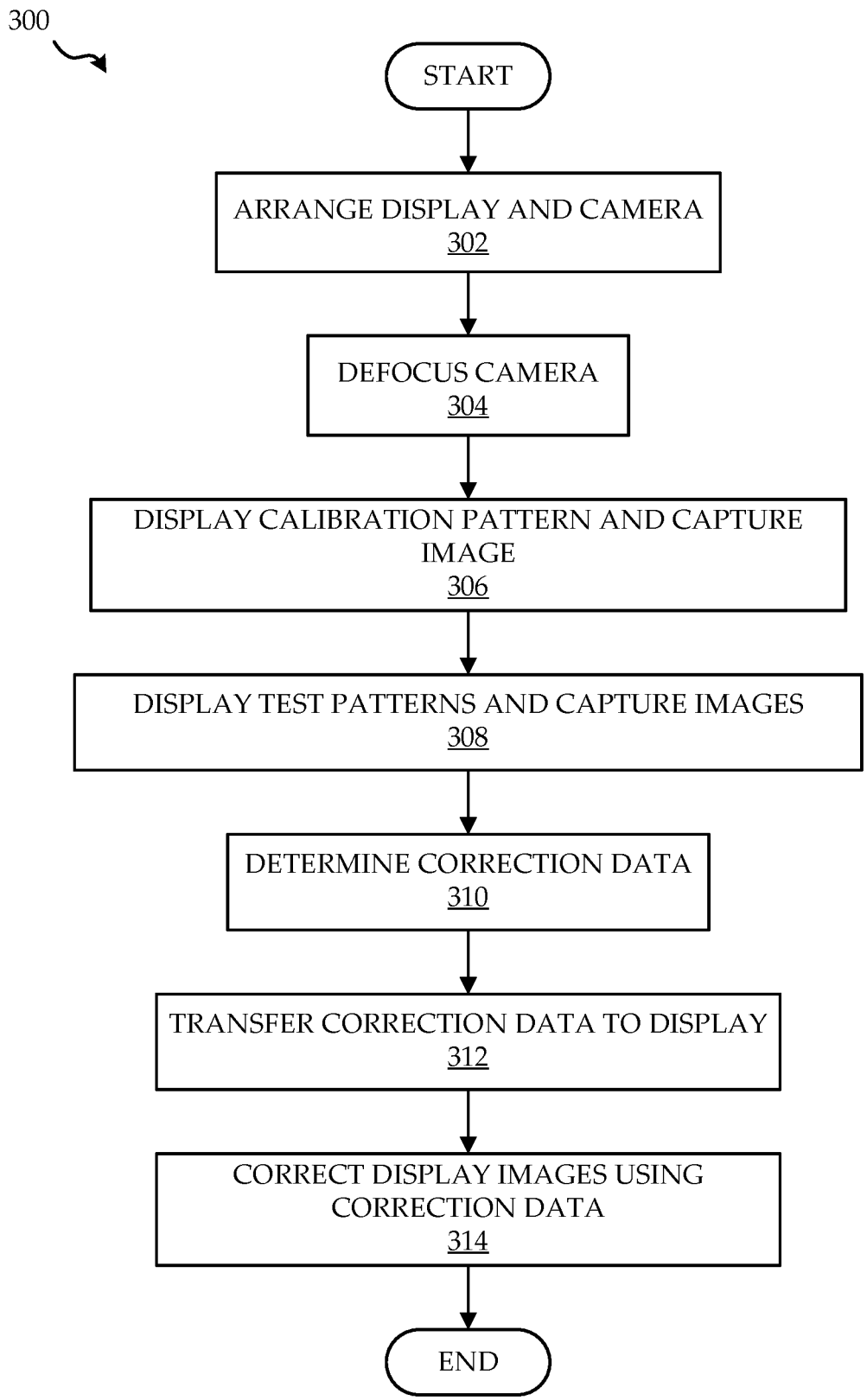
FIG. 3 is a high level functional block diagram of an optical correction method.

With reference also to the optical correction method 300 of FIG. 3, camera 230 and the display panel 220 are arranged 302 such that the entirety of the viewable area of the display panel 220 appears within the field of view of the camera 230. In some embodiments, the camera 230 is positioned in front of display panel 220, aimed at the center of the viewable area of the display panel 220 and with the viewable area of the display panel 220 maximized to occupy as much of the field of view of the camera 230 as possible. The line of sight of the camera 230 (controlled by camera pan, tilt, and positioning) may be such that it is parallel and coincident with a normal to the plane of the front surface of the display panel 220 emerging at the center of the display panel 220 to reduce distortions and to ensure any remaining distortions are as symmetrical as possible in the resulting images of the display panel 220. Calibration pattern processing discussed below, however, can compensate for deviations in the relative placement and alignment of the camera 230 and the display panel 220.

Once the camera 230 and the display panel 220 have been arranged 302 relative to each other, the camera 230 is intentionally defocused 304. The defocusing of the camera 230 results in the focal point of the camera being positioned either in front of or behind a plane passing through the light emitting elements of the pixels 110 of the display panel 220. The amount of defocusing is set such that it is sufficient, in the context of the particular display panel 220 and camera 230, to avoid aliasing (moiré). This amount of defocusing generally depends upon a number of factors, primarily upon the ratio of the resolution of the camera 230 to the resolution of the display panel 220, but also upon the number and arrangement of subpixels per pixel 110 in the display panel 220, the number and arrangement of optical sensors (CCD, CMOS, etc.), the presence of color/bayer and/or antialiasing filters in the camera 230, and any effects caused by the optics of the front surface layers of the display panel 220, etc. The level of defocusing will vary from case to case, but generally the amount of defocusing which is sufficient to avoid aliasing (moiré) is directly determined through empirical testing. In some embodiments the minimum amount of defocusing to completely remove aliasing is chosen.

Instead of displaying all pixels of the display panel 220 simultaneously according to known techniques, in combination with intentional defocusing, the present embodiments display a number of display test patterns, each of which includes a sparse set of activated pixels which are spaced apart far enough so that at least some portion of the blurred images of each of the activated pixels in the captured images do not overlap or interfere with each other. Typically this portion would include (but is not limited to) the center of each blurred image of the activated pixels, and in some cases this non-overlapping portion would constitute a majority of each blurred image of an activated pixel, in which case, only the outer portions or edges of the blurred images of the pixels would overlap. In some embodiments, and for some test patterns, the blurred images of the activated pixels in the captured images do not have any overlap with each other. Combining the defocusing with appropriately spaced apart activated pixels simultaneously avoids aliasing (moiré) while accommodating use of a camera 220 with a resolution well below the Nyquist limit to measure individual pixel luminances. Moreover, by avoiding overlap for at least some portion of each image of each pixel, the highest frequency mura may be characterized i.e. accurate measurements of the luminance on an individual pixel basis is possible. As described below, even in embodiments with some overlap of the blurred images of the individual pixels, as long as the overlap is controlled, accurate measurements of the luminance of each individual pixel may be made with appropriately chosen acquisition kernals which avoid or processes areas of overlap with appropriate weights.

In embodiments where the amount of defocusing is chosen to be as small as possible while still avoiding aliasing (moiré), smaller point spread images of the activated pixels are created, allowing for a more streamlined process by involving fewer test patterns each of which requires smaller spaces between activated pixels to avoid overlap. In some embodiments, only individual channels (R, G, B, Y, W etc) of each activated pixel are activated at any one time.

Once the camera has been defocused 304 a calibration pattern is displayed on the display panel 230 and an image is captured 306 by the camera 220. In some embodiments, the calibration pattern includes a sparse set of single pixels activated differently from a flat background. Preferably, in some embodiments, the spacing of the sparse set of single activated pixels of the calibration pattern is such that the images of those pixels in images taken by the camera 230 do not have any overlap. In some embodiments the activated pixels are set at a discernably bright greyscale and the flat background is black. In some embodiments, only individual channels (e.g. R, G, or B) of any activated pixel are activated at any one time. In some embodiments, the activated pixels are arranged in a spaced rectilinear array or a rectangular lattice. In such embodiments the activated pixels are located at corners of an imaginary grid which would result from imaginary lines drawn through the rows and columns of activated pixels and is also known as a dot grid. Other regular lattices include triangular, and diamond pattern lattices. Any sparse set of activated pixels of sufficient spacing may be used whether arranged in a regular or irregular lattice. The calibration pattern is utilized to establish the location of the individual pixels on the display panel 220 in the captured images which are captured by the camera 230. The activated pixels in the calibration pattern are chosen such that the subpixel layout of the panel is sufficiently captured. The center of the activated pixels are then located within the captured image and an nth polynomial approximation is then performed, to calculate the location of every subpixel on the panel in the image. The distribution and pattern of the locations of the pixels of the calibration pattern as they appear in the captured image which is captured by the camera 230 (hereinafter the "calibration image") allows correction of any geometrical distortion, such as rotation, tilt and skew, in subsequent images of the display panel 220 taken by the camera 230. The calibration image also samples the point spread function (PSF) caused by the defocusing and corresponding to the blurring of pixels located in each area of the image of the display panel 220. Although the PSF may be substantially homogeneous across the captured images taken of the display panel 220, often due to many factors, including the structure of the lens system of the camera 230, the PSF may be non-uniform throughout various areas of the captured images of the display panel 220. In the case of a calibration pattern of sparse individual pixels, the point spread function is substantially directly observable in the image captured by the camera 230. In some embodiments more than one calibration pattern is utilized. In some embodiments, no separate calibration pattern is used, and instead, one or more of the test patterns discussed below serve the same functions as the calibration pattern and in other embodiments "calibration pixels" are included within the series of display test patterns and serve the same function as the calibration pattern. The point spread function may be utilized in display panel 220 pixel luminance determination as discussed below.

In some embodiments, the number, size, and arrangement of the sub-pixels will be such that it is preferable to limit each activated pixel of the calibration pattern to a single channel R, G, B, etc. This ensures any slight difference between sub-pixel locations of R, G, B, and any slight differences in the PSFs for each channel R, G, B, etc. will accurately be associated with each measurement separately. The calibration pattern or patterns should have enough red, green, and blue calibration pixels to adequately characterize the display panel 220 in accordance with the foregoing.

Once the calibration pattern has been displayed and captured 306, a series of display test patterns is displayed by the display panel 220 and images are captured by the camera 230. Each test pattern of the series of display test patterns include pixels having non-zero greyscale luminance spaced apart far enough so that some portion of each image of each pixel of the pattern displayed on the display panel 220 as it appears in the captured images, which are blurred according to the PSF, do not interfere or overlap with images of the other pixels of the pattern. As described above, intentional defocusing of the camera 230 is such that images of each illuminated pixel of the display panel 220 appears as a spread out blurred image of that pixel according to the PSF and problems due to aliasing (moiré) are avoided. In some embodiments, the activated pixels of the display test patterns are arranged in a spaced rectilinear array or a rectangular lattice. In such embodiments the activated pixels are located at corners of an imaginary grid which would result from imaginary lines drawn through the rows and columns of activated pixels and is also known as a dot grid. Other regular lattices include triangular, and diamond pattern lattices. Any sparse set of activated pixels of sufficient spacing may be used whether arranged in a regular or irregular lattice.

The series of display test patterns are such that each pixel 110 of the display panel 220 may be corrected with correction data based on measurements in the form of the captured images by the camera 230 of the display panel 220 displaying the display test patterns. Preferably, the resolution of the display test pattern is the same as the resolution of the display panel 220.

In some embodiments, the series of display test patterns are such that each pixel of the display panel 220 is activated at more than one level of greyscale luminance. In some embodiments, this is done separately for each channel R, G, B, etc. In some embodiments, the series of display test patterns include, for every pixel, at least one pattern having that pixel activated at a fixed first greyscale luminance value P1 and at least one other pattern having that pixel activated at a fixed second greyscale luminance value P2. The first and second fixed greyscale luminance values P1, P2 used to activate the pixel are generally chosen based on what levels of greyscale are desired to exhibit the greatest uniformity. In some embodiments, the series of display test patterns include, for every pixel, at least one pattern having that pixel activated at a fixed relatively low greyscale luminance value P1 (for example 10 percent of the possible maximum greyscale luminance value) and at least one other pattern having that pixel activated at a fixed relatively high greyscale luminance value P2 (for example 80 percent of the possible maximum greyscale luminance value). Over the series of display test patterns, every single pixel is programmed at least once with each of P1 and P2 and corresponding resulting luminances of the pixel caused by programming the pixel with P1 and P2 are determined from the images of that pixel in those captured images of the display panel 220 displaying those display test patterns with that pixel at values P1 and P2. Pixels of the display test patterns having values P1 or P2 are referred to hereinafter as "regular test pixels".

The number of display test patterns and the levels of the illuminated pixels therein depends upon the technique used to correct the data used to program each pixel. The example embodiments which follow correct the display panel non-uniformity by determining the DAC (Digital to Analogue Converter) signal which corrects the luminance non-uniformity of the panel by determining information about the DAC signal to luminance scale factor. The scale factor, once determined is used to scale the DAC correction signal to the luminance non-uniformity so that the correction applied corrects for the non-uniformity. This scale factor is obtained by also including in the series of test patterns, a subset of pixels (for example ⅓ or ¼ of the total number of pixels of the display panel 220) throughout the display test patterns such that the pixel is activated with greyscale luminance values near P1 and P2, i.e. at a DAC signal level of P1 or P2 changed by some small $\Delta$ (+$\Delta$ or −$\Delta$). In some embodiments, $\Delta$ is a small percentage of the maximum greyscale luminance level (such as 1%), and in other embodiments, $\Delta$ is on the order of the smallest incremental digital value in the DAC signal. In some embodiments, this is done separately for each channel R, G, B, etc. The difference between the luminance produced by the pixels of the display panel 220 displaying a value of P1 (or P2) and the luminance produced by the pixels of the display panel 220 displaying a value of P1+$\Delta$ or −$\Delta$ (or P2+$\Delta$ or −$\Delta$) allows extraction of the scale factor between the DAC signal and measured luminance at P1 (or P2) and therefore can be used to translate luminance non-uniformity into a correction signal. In some embodiments, the series of display test patterns includes pixels of greyscale luminance levels including both +$\Delta$ and −$\Delta$ about values P1 and P2. In some embodiments, instead of small positive and negative changes symmetrically about the midpoint PX, the small positive change +delta and the small negative change are −Delta not identical in magnitude. In some embodiments, the multilevel pixels about P1 are not at the same locations as the multilevel pixels about P2. In some embodiments the multilevel pixels include multilevel sample greyscale luminances of more than two levels for each PX.

The subset of pixels of the display test patterns is chosen to be less than the total number of pixels of the display panel 220 because the scale factor does not deviate greatly pixel to pixel and generally exhibits localized uniformity but exhibits global non-uniformity over the entire display panel 220. Although multilevel data for only those display panel pixels which display the subset of pixels (hereinafter "multilevel pixels") of the display test patterns is extracted, the scale factors corresponding to P1 and P2 for all pixels may be estimated with use of an interpolation algorithm, such as bilinear interpolation for a rectilinear subset, or any other method appropriate for the particular arrangement of the subset of pixels. In some embodiments the measured luminances are interpolated first, and scale factors for all pixels are determined from those values, while in other embodiments the scale factors are determined first for some pixels and then interpolated for all pixels.

To correct the panel within the set of all possible input DAC, P1 and P2 should be chosen to be far apart, and value 1 should be chosen low enough to approximate properly panel non-uniformity for all possible DAC values. In other embodiments, regular test pixels include pixels at N levels, P1, PN, and the multilevel pixels include pixels at 2N levels, namely, at P1+$\Delta$, P1−$\Delta$, . . . , PN+$\Delta$, PN−$\Delta$.

Once all of the display test patterns have been displayed and captured 308, correction data is determined 310 from a processing by the optical correction processing 240 of all of the images taken by the camera 230. The calibration image or images taken by the camera of the calibration pattern or patterns are processed. As described above, the calibration image is processed to establish the location of individual pixels on the display panel 220 and to correct for any geometrical distortion such as rotation, tilt, and skew. For calibration patterns with sparse activated pixels whose images in the calibration image do not overlap, the PSFs of various regions of the display panel 220 are directly observable from the images of the blurred activated pixels and may be substantially directly extracted from the calibration image. Generally, data forming a mapping of display panel 220 pixel locations to image pixel locations in images captured by the camera 230 are produced along with data which allow the extraction of an estimate of the PSF for every pixel of the display panel 220.

Once the calibration image is processed, the captured images of the display test patterns displayed by the display panel 220 are processed. Using the known location within the captured image of each pixel of the display panel 220, and using the expected PSF in the area of the known location, a luminance of each pixel of the display panel 220 is extracted. In some embodiments, an acquisition kernel, acquisition filter, or integration window is used to extract a value of the luminance of each pixel of the display panel 220. In some embodiments, a deblurring, sharpening, or deconvolution algorithm is used to extract a value of the luminance of each pixel of the display panel 220. In some embodiments, this is done separately for each channel R, G, B, etc. In some embodiments the acquisition kernel is centered on the expected known location of each pixel being measured, and uses either an unweighted or weighted integral of a size and shape taking into account the PSF of the particular area of the pixel and the spacing in the captured image between the activated pixels of the test pattern. In some embodiments in which the defocusing and spacing of the pixels causes images of the pixels to partially overlap, the acquisition kernel is weighted so as to ignore the areas of overlap, or is otherwise configured and processed so that areas of overlap do not introduce errors in the determination of the luminance of each pixel. In some embodiments the acquisition kernel is generally rectangular and in other embodiments it is generally circular. Other acquisition kernals are possible, and in general they are sized, shaped, and weighted in accordance with the PSF and the spacing in the captured image of the activated pixels of the test pattern.

The luminances L1 and L2 for every pixel of the display panel 220 when driven respectively at P1 and P2 are determined. These correspond to the luminance measurements of the pixels 110 of the display panel 220 which displayed the regular test pixels of the display test patterns. Further luminances L1a, L1b, L2a, and L2b for the sparse subset of the pixels of the display panel 220 when driven respectively by P1+Δ, P1−Δ, P2+Δ, and P2−Δ are also determined. These correspond to the luminance measurements of the pixels 110 display panel 220 which displayed the multilevel test pixels of the display test patterns. For every pixel of the display, scale factors S1 and S2 associated respectively with DAC signal P1 and P2 may be determined from measured luminances L1a, L1b, L2a, and L2b when available for that pixel, or are interpolated from scale factors S1 and S2 of other pixels of the display for which measured luminances L1a, L1b, L2a, and L2b are available or are calculated from L1a, L1b, L2a, and L2b values interpolated from L1a, L1b, L2a, and L2b of other pixels of the display for which those measurements exist. In embodiments where the multilevel pixels about P1 are not at the same locations as the multilevel pixels about P2, spatial interpolation of the luminances L1a, L1b, L2a, and L2b at pixels which have the values can be used to determine a luminance L1a, L1b, L2a, and L2b for the pixel in question, in order to determine the scale factors.

In one embodiment, S1 is determined from measured luminances L1, L1a, and L1b and Δ as:

$$S1 = \frac{1}{2}\left(\frac{\Delta}{L1a - L1} + \frac{\Delta}{L1 - L1b}\right) \quad (1)$$

and S2 is determined from measured luminances L2, L2a, and L2b and Δ as:

$$S2 = \frac{1}{2}\left(\frac{\Delta}{L2a - L2} + \frac{\Delta}{L2 - L2b}\right) \quad (2)$$

Analogous scale factors may be determined similarly for embodiments having regular test pixels which include pixels at N levels, P1, PN, and the multilevel test pixels include pixels at 2N levels, namely, at P1+Δ, P1−Δ, . . . , PN+Δ, PN−Δ. In some embodiments, processing is performed separately for each channel R, G, B, etc. Higher order approximations may be obtained for embodiments with more than two multilevel samples about each point PX, e.g. for four multilevel pixels P1+Δ, P1−Δ, P1+δ, P1−δ.

As can be seen from equations (1) and (2), the scale factors S1 and S2 quantify the relationship, respectively at DAC points P1 and P2, between a change in DAC signal value and the resulting change in luminance.

The measured luminance L1 at P1 is compared to a known expected luminance to determine an actual deviation in luminance. The actual deviation in luminance and the scale factor S1 are used to determine a corrected DAC signal CP1, i.e. the corrected signal which causes the pixel to produce the desired actual luminance for greyscale luminance value P1. Similarly a corrected DAC signal CP2 is calculated for correcting greyscale luminance value P2. From these two points (P1, CP1) and (P2, CP2) a linear relationship of the form CPn=B*Pn+C is determined and hence for any desired greyscale luminance value Pn, a corrected DAC value CPn may be calculated.

The correction data for each pixel therefore includes the slope B and offset C, as determined above using L1, L2, S1, and S2, to determine the corrected DAC value CPn from any input greyscale luminance value Pn.

The correction data, once determined 310 is transferred 312 to the display 250 via the controller 202 and stored in memory 106.

During operation of the display 250, correction data stored in memory 106 is used by the controller 202 or in combination with a separate compensation block (not shown) to correct image data input to the display 250 for display on the display panel 220. In some embodiments, the slope B and offset C are calculated for each pixel of the display panel 220, using for example interpolation, prior to being stored in the display 250, to reduce processing required of the display 250 while correcting DAC signals. For embodiments having regular test pixels which include pixels at N levels (where N>2), and multilevel test pixels at 2N levels, the correction data includes higher order coefficients of (N−1)th order polynomials directly analogous to the linear relationship described above. In some embodiments, the correction data include slope B and offset C (or analogous higher order coefficients) for each channel, R, G, B, etc.

When the pixels 110 of the display panel 220 are driven by the corrected signals, the image displayed by the display panel 220 exhibits greatly reduced or negligible non-uniformity.

As described herein above, the calibration patterns along with the display test patterns should include the calibration pixels, the regular test pixels, and the multilevel pixels, while ensuring that in each pattern the pixels are spaced far enough apart so images of these activated pixels in the captured images have at least some portion which does not overlap with blurred images of other pixels. In some embodiment these pixels are displayed separately for each of the channels R, G, B, etc. The ordering and grouping of the pixels in the display test patterns does not matter. In some embodiments, each display test pattern only has pixels of the same channel, in other embodiments only of the same level (e.g. P1 or P2), while in other embodiments each display test pattern includes pixels of more than one or of all channels, and in other embodiments each test pattern includes pixels of both levels. As described above each pixel of the display panel 220 should be driven at the two levels P1, P2 (or more in the case of P1, PN) and a subset of pixels should be driven as multilevel pixels to provide data for the scale factors S1, S2 (or possibly S1, . . . , SN). Although the ordering and grouping of the pixels in the test patterns does not matter, ideally the spacing is minimized to minimize the total number of display test patterns displayed. This reduces the capture time of the process.

Figure 4:
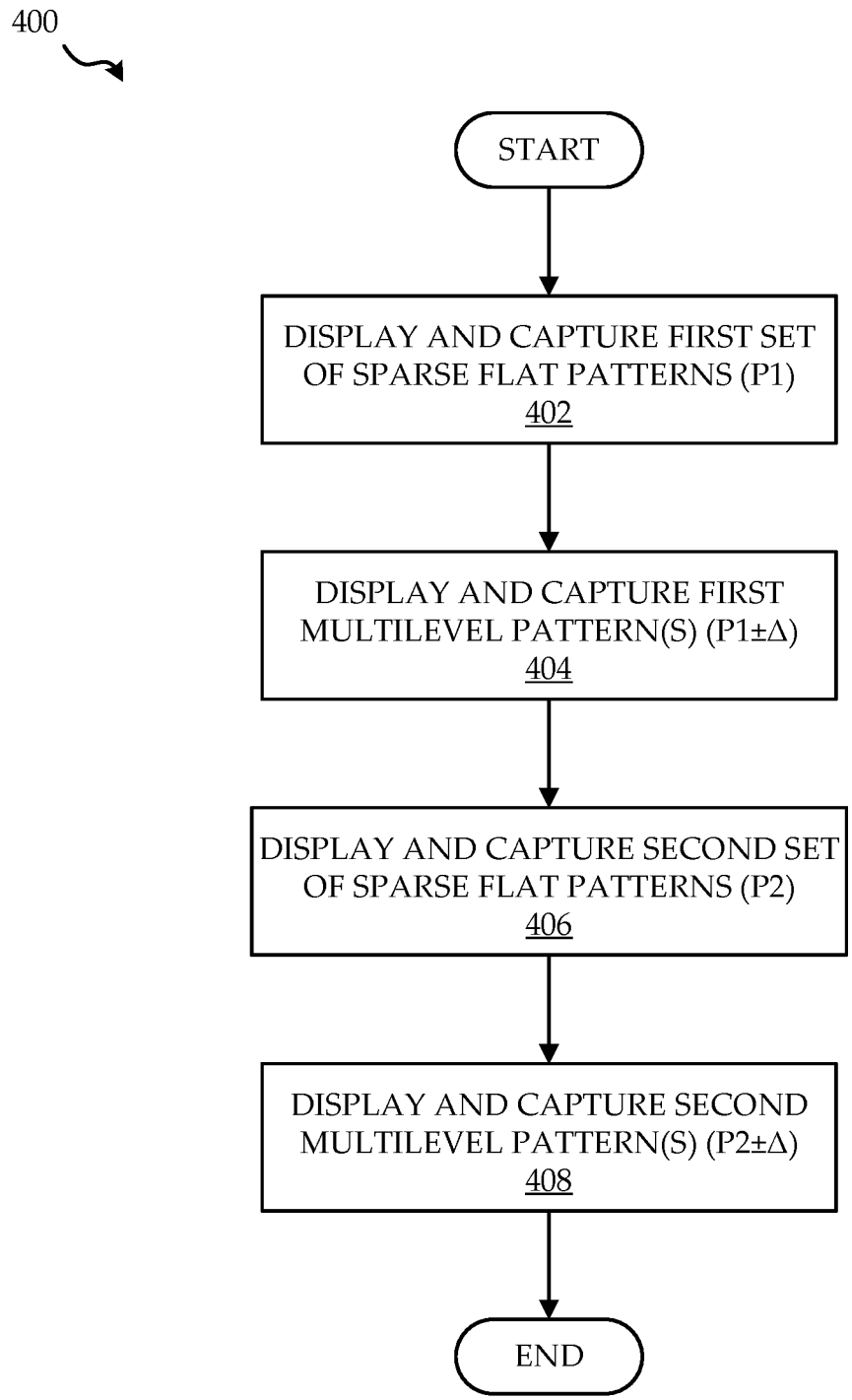
FIG. 4 illustrates an example method of displaying and capturing display test patterns of the method illustrated in FIG. 3.

In some embodiments, the pixels of the display test patterns displayed and captured 308 are grouped into specific types of display test patterns. FIG. 4 illustrates a specific method 400 of displaying and capturing 308 display test patterns in which the regular test pixels and multilevel pixels have been grouped in specific ways. In some embodiment, all of the following is performed separately for each channel of the display R, G, B, etc.

At 402 a first set of sparse flat test patterns are displayed, each pattern of the set such that all of the activated pixels of the pattern are at level P1. The number of display test patterns in the first set of sparse flat patterns depends upon the spacing of pixels in the array which avoids or produces the expected amount of overlap. For example, if each flat test pattern has activated pixels in a square rectilinear array or rectangular lattice spaced apart vertically and horizontally by three inactive pixels, then the first set of sparse flat patterns would include a total of 16 test patterns, each shifted vertically and or horizontally with respect to each other. The first set of sparse test patterns, ensures the regular test pixel at level P1 is measured for every pixel of the display panel 220.

At 404 a first set of one or more multilevel patterns is displayed, each pattern of the set such that all of the activated pixels of the pattern are at level P1 plus or minus a small Δ. The desired number of pixels (equivalently the density of pixels) for the subset constituting the multilevel pixels about P1 will vary depending upon the exhibited amount of nonuniformity in the scale factor for the type of particular display panel 220 being measured. The number of display test patterns in the first set of one or more multilevel patterns depends upon the spacing of pixels in the array which avoids or produces the expected amount of overlap, and the desired number of pixels (or the desired pixel density) in the subset constituting the multilevel pixels about P1. In embodiments where the scale factor exhibited across the display panel 220 is generally uniform, only one multilevel pattern for P1 may be required. The first set of one or more multilevel patterns (P1±Δ), ensures all desired multilevel pixels for the display panel 220 about level P1 are measured.

At 406 a second set of sparse flat test patterns are displayed, each pattern of the set such that all of the activated pixels of the pattern are at level P2. The number of display test patterns in the second set of sparse flat patterns depends upon the spacing of pixels in the array which avoids or produces the expected amount of overlap. For example, if each flat test pattern has activated pixels in a square rectilinear array or rectangular lattice spaced vertically and horizontally by three pixels, then the second set of sparse flat patterns would include a total of 16 test patterns, each shifted vertically and or horizontally with respect to each other. The second set of sparse test patterns, ensures the regular test pixel at level P2 is measured for every pixel of the display panel 220.

At 408 a second set of one or more multilevel patterns is displayed, each pattern of the set such that all of the activated pixels of the pattern are at level P2 plus or minus a small Δ. The number of display test patterns in the second set of one or more multilevel patterns depends upon the spacing of pixels in the array which avoids or produces the expected amount of overlap, and the desired number of pixels (or desired pixel density) in the subset constituting the multilevel pixels about P2. Generally this number of pixels (or pixel density) will be the same as that for the number of pixels in the subset constituting the multilevel pixels about P1, and for the same reasons. In embodiments where the scale factor exhibited across the display panel 220 is generally uniform, only one multilevel pattern for P2 may be required. The second set of one or more multilevel patterns (P2±Δ), ensures all desired multilevel pixels for the display panel 220 about level P2 are measured.

While particular implementations and applications of the present disclosure have been illustrated and described, it is to be understood that the present disclosure is not limited to the precise construction and compositions disclosed herein and that various modifications, changes, and variations can be apparent from the foregoing descriptions without departing from the spirit and scope of an invention as defined in the appended claims.

What is claimed is:

1. An optical correction method for correcting for non-uniformity of an emissive display panel having pixels, each pixel having a light-emitting device, the method comprising:
arranging a camera in front of the display panel;
displaying from each pixel of a first sparse set of activated pixels of the display:
 a first greyscale luminance value of a relatively low greyscale luminance value, and
 a second greyscale luminance value of a relatively high greyscale luminance value which is spaced apart from the first greyscale luminance value by a relatively large greyscale luminance value difference;
displaying from pixels of a second sparse set of activated pixels of the display:
 a third greyscale luminance value greater or less than the first greyscale luminance value by a first relatively small greyscale luminance value difference, the relatively large greyscale luminance value difference being greater than said first relatively small greyscale luminance value difference,
displaying from pixels of a third sparse set of activated pixels of the display:
 a fourth greyscale luminance value greater or less than the second greyscale luminance value by a second relatively small greyscale luminance value difference, the relatively large greyscale luminance value difference being greater than said second relatively small greyscale luminance value difference;

measuring a luminance of each pixel of the first, second, and third sparse sets of activated pixels of the display with the camera while displaying the first greyscale luminance, the second greyscale luminance, the third greyscale luminance, and the fourth greyscale luminance, to generate luminance measurement data including respectively first luminance measurement data, second luminance measurement data, third luminance measurement data, and fourth luminance measurement data; and determining from said luminance measurement data with use of a determined comparison between the first and third luminance measurement data and a determined comparison between the second and fourth luminance measurement data, correction data for correcting non-uniformity of images displayed in the display panel.

2. The optical correction method of claim 1, further comprising:

defocusing the camera such that the focal point of the camera lies outside of a plane passing through the light-emitting devices of the display panel, the defocusing such that individual pixels of the display panel are blurred in images of the display panel captured by the camera;

wherein said measuring a luminance of each of said pixels of the first, second, and third sparse sets of activated pixels of the display comprises capturing images of the display with the camera;

wherein each of the first, second, third, and fourth greyscale luminance values are different from a greyscale luminance of a flat background greyscale displayed between said activated pixels, wherein locations of said activated pixels are spaced apart such that in each captured image, at least one portion of each blurred image of each activated pixel does not overlap with a blurred image of another activated pixel;

wherein said displaying said first, second, third, and fourth greyscale luminance values includes programming each pixel of said first, second, and third sparse set of activated pixels by:

displaying a plurality of test patterns while said capturing said images, each of said displayed test patterns comprising a set of activated image pixels at image locations corresponding to said locations of said activated pixels, for programming each pixel of the first, second, and third sparse sets of activated pixels to display said first, second, third, and fourth greyscale luminance values, said activated image pixels of the plurality of displayed test patterns including:

regular test pixels, for programming each activated pixel to display said first and second greyscale luminance values; and multilevel pixels, for programming each activated pixel to display said third and fourth greyscale luminance values.

3. The optical correction method of claim 2, wherein a resolution of the camera is less than twice a resolution of the display panel, and wherein the amount of blurring in images of the display panel captured by the camera is sufficient to avoid aliasing in the captured images of the display panel.

4. The optical correction method of claim 2, wherein said locations of said activated pixels are arranged in a diamond or rectangular lattice.

5. The optical correction method of claim 2, further comprising determining correction data for an activated pixel of the display panel with use of the first and second luminance measurement data, and with use of luminance measurements of pixels throughout the display panel when displaying the multilevel pixels of the displayed test patterns.

6. The optical correction method of claim 5, wherein said activated image pixels of the plurality of the displayed test patterns comprise calibration pixels, the method further comprising:

determining locations of the activated pixels as they appear in the captured images of the displayed test patterns; and determining at least one point spread function exhibited by blurred images of activated pixels in the captured images, wherein the activated image pixels of the plurality of displayed test patterns are spaced apart such that in the captured images, blurred images of each calibration pixel does not overlap with blurred images of any other activated pixel.

7. The optical correction method of claim 6, wherein each of the luminance measurements of each of the regular test pixels and each of the multilevel pixels is performed with use of an acquisition kernel determined from at least one of a spacing of the activated pixels and the at least one point spread function.

8. The optical correction method of claim 1, wherein the relatively low greyscale luminance value is substantially 10 percent of the maximum possible greyscale luminance value, and the relatively high greyscale luminance value is substantially 80 percent of the maximum greyscale luminance value.

9. The optical correction method of claim 1, wherein the relatively small greyscale luminance value is one of substantially 1 percent of the maximum possible greyscale luminance value and the smallest incremental digital value of possible greyscale luminance values.

10. The optical correction method of claim 5, wherein all of said regular test pixels of the relatively low greyscale luminance value are displayed in a first set of sparse flat test patterns, wherein all of said regular test pixels of the relatively high greyscale luminance value are displayed in a second set of sparse flat test patterns, wherein all of said multilevel pixels having a greyscale luminance value greater or less than the relatively low greyscale luminance value are displayed in a first set of multilevel patterns, and wherein all of said multilevel pixels having a greyscale luminance value greater or less than the relatively high greyscale luminance value are displayed in a second set of multilevel patterns.

11. The optical correction method of claim 1, further comprising correcting image data with use of the correction data prior to driving the pixels to display an image corresponding to the image data.

12. An optical correction system for correcting non-uniformity of an emissive display having pixels, each pixel having a light-emitting device, the system comprising:

a camera arranged in front of the display for capturing images of the display panel while each pixel of a first sparse set of activated pixels of the display displays:

a first greyscale luminance value of a relatively low greyscale luminance value, and a second greyscale luminance value of a relatively high greyscale luminance value which is spaced apart from the first greyscale luminance value by a relatively large greyscale luminance value difference;

and while each pixel of a second sparse set of activated pixels of the display displays:

a third greyscale luminance value greater or less than the first greyscale luminance value by a first relatively small greyscale luminance value difference, the relatively large greyscale value difference being greater than said first relatively small greyscale luminance value difference;

and while each pixel of a third sparse set of activated pixels of the display displays:
a fourth greyscale luminance value greater or less than the second greyscale luminance value by a second relatively small greyscale luminance value difference, the relatively large greyscale luminance value difference being greater than said second relatively small greyscale luminance value difference; and optical correction processing coupled to the camera and for
receiving from the camera captured images of each pixel of the first, second, and third sparse sets of activated pixels of the display while displaying the first greyscale luminance, the second greyscale luminance, the third greyscale luminance and the fourth greyscale luminance, to generate luminance measurement data including respectively first luminance measurement data, second luminance measurement data, third luminance measurement data, and fourth luminance measurement data;
determining from said luminance measurement data, correction data with use of a determined comparison between the first and third luminance measurement data and a determined comparison between the second and fourth luminance measurement data for correcting non-uniformity of images displayed in the display; and
transmitting the correction data to the display for storage in a memory of the display.

13. The optical correction system of claim 12, wherein each of the first, second, third, and fourth greyscale luminance values are different from a greyscale luminance of a flat background greyscale displayed between said activated pixels, wherein the camera is defocused such that the focal point of the camera lies outside of a plane passing through the light-emitting devices of the display and such that individual pixels of the display are blurred in images of the display captured by the camera, wherein locations of said activated pixels are spaced apart such that in each captured image, at least one portion of each blurred image of each activated pixel does not overlap with a blurred image of another activated pixel; and
wherein, to display said first, second, third, and fourth greyscale luminance values includes, a controller of the emissive display programs each pixel of said first, second, and third sparse set of activated pixels by:
displaying a plurality of test patterns while said capturing said images, each of said displayed test patterns comprising a set of activated image pixels at image locations corresponding to said locations of said activated pixels, for programming each pixel of the sparse set of activated pixels to display said first, second, third, and fourth greyscale luminance values, said activated image pixels of the plurality of displayed test patterns including:
regular test pixels, for programming each activated pixel to display said first and second greyscale luminance values; and
multilevel pixels, for programming each activated pixel to display said third and fourth greyscale luminance values.

14. The optical correction system of claim 13, wherein a resolution of the camera is less than twice a resolution of the display, and wherein the amount of blurring in images of the display panel captured by the camera is sufficient to avoid aliasing in the captured images of the display panel.

15. The optical correction system of claim 13, wherein said locations of said activated pixels are arranged in a diamond or rectangular lattice.

16. The optical correction system of claim 13, wherein the optical correction processing is further for
determining correction data for an activated pixel of the display with use of the first and second luminance measurement data, and with use of luminance measurements of pixels throughout the display when displaying the multilevel pixels of the displayed test patterns.

17. The optical correction system of claim 16, wherein said activated image pixels of the plurality of the displayed test patterns comprise calibration pixels, and wherein the optical correction processing is further for
determining locations of the activated pixels as they appear in the captured images of the displayed test patterns; and
determining at least one point spread function exhibited by blurred images of activated pixels in the captured images,
wherein the activated image pixels of the plurality of displayed test patterns are spaced apart such that in the captured images, blurred images of each calibration pixel does not overlap with blurred images of any other activated pixel.

18. The optical correction system of claim 17, wherein each of the luminance measurements of each of the regular test pixels and each of the multilevel pixels is performed by the optical correction processing with use of an acquisition kernel determined from at least one of a spacing of the activated pixels and the at least one point spread function.

19. The optical correction system of claim 12, wherein the relatively low greyscale luminance value is substantially 10 percent of the maximum possible greyscale luminance value, and the relatively high greyscale luminance value is substantially 80 percent of the maximum greyscale luminance value.

20. The optical correction system of claim 12, wherein the relatively small greyscale luminance value is one of substantially 1 percent of the maximum possible greyscale luminance value and the smallest incremental digital value of possible greyscale luminance values.

21. The optical correction system of claim 16, wherein all of said regular test pixels of the relatively low greyscale luminance value are displayed in a first set of sparse flat test patterns, wherein all of said regular test pixels of the relatively high greyscale luminance value are displayed in a second set of sparse flat test patterns, wherein all of said multilevel pixels having a greyscale luminance value greater or less than the relatively low greyscale luminance value are displayed in a first set of multilevel patterns, and wherein all of said multilevel pixels having a greyscale luminance value greater or less than the relatively high greyscale luminance value are displayed in a second set of multilevel patterns.

22. The optical correction system of claim 12, further comprising:
a controller of the emissive display coupled to said optical correction processing, said controller for
receiving image data for display by the display;
receiving from the optical correction processing the correction data; and
correcting the image data with use of the correction data prior to driving the pixels to display an image corresponding to the image data.

* * * * *